Sept. 30, 1969　　　J. F. O'BRIEN　　　3,469,822
PORTABLE ENCLOSURE
Filed Feb. 23, 1968　　　　　　　　　　　3 Sheets-Sheet 1
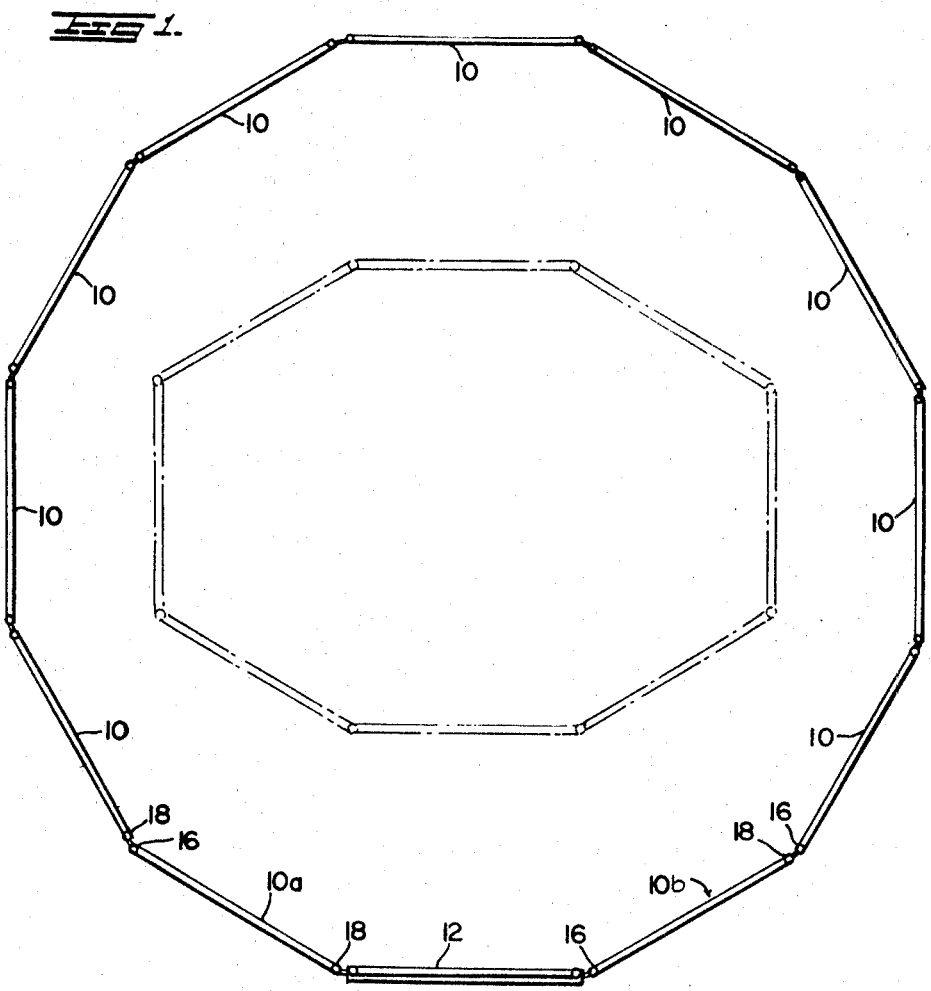
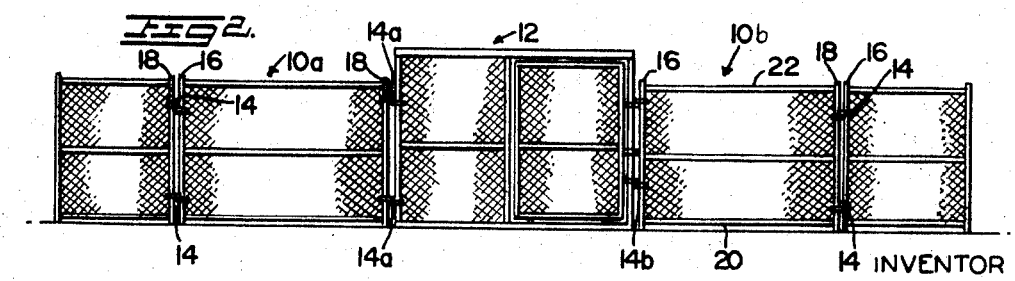
INVENTOR
JOSEPH FRANCIS O'BRIEN
Christen, Sabol + O'Brien
ATTORNEYS Sept. 30, 1969  J. F. O'BRIEN  3,469,822
PORTABLE ENCLOSURE Filed Feb. 23, 1968  3 Sheets-Sheet 2

INVENTOR
JOSEPH FRANCIS O'BRIEN

Christen, Sabol + O'Brien
ATTORNEYS

Sept. 30, 1969      J. F. O'BRIEN      3,469,822
PORTABLE ENCLOSURE
Filed Feb. 23, 1968      3 Sheets-Sheet 3
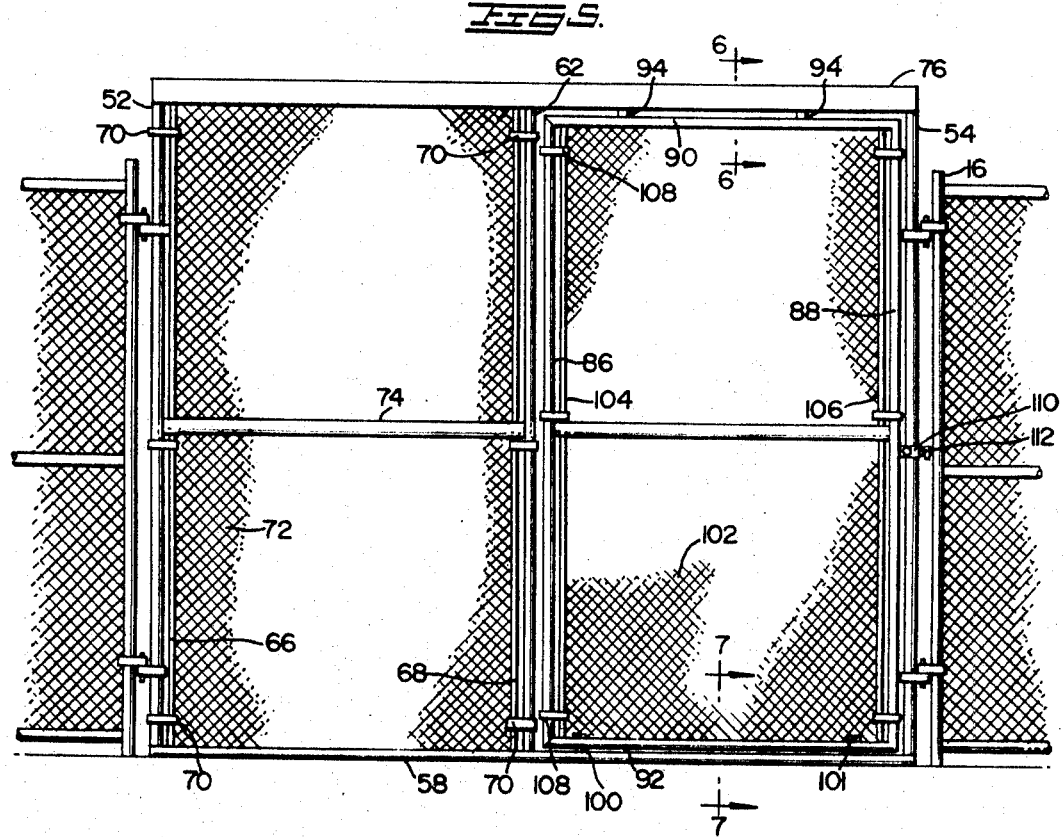
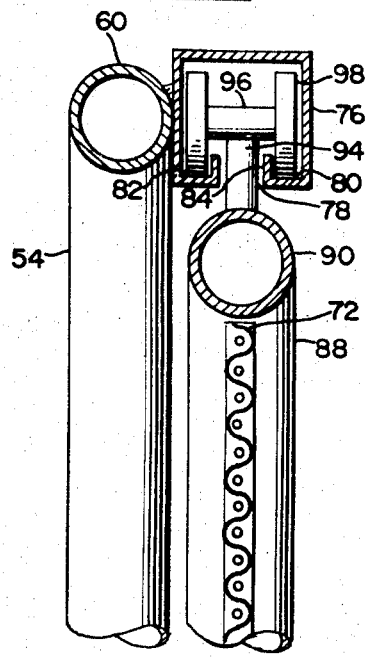
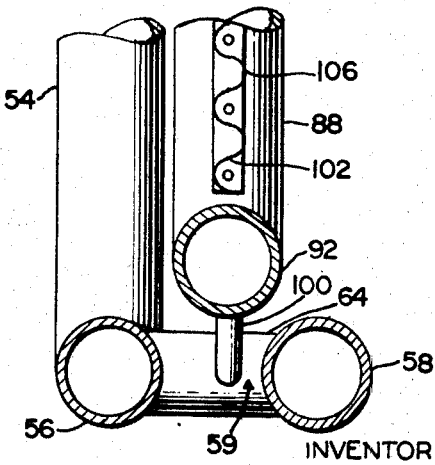
INVENTOR
JOSEPH FRANCIS O'BRIEN
Christen, Sabol & O'Brien
ATTORNEYS

United States Patent Office 3,469,822
Patented Sept. 30, 1969

3,469,822
PORTABLE ENCLOSURE
Joseph Francis O'Brien, 4227 Soth Ave.,
Perry Hall, Md. 21236
Filed Feb. 23, 1968, Ser. No. 707,788
Int. Cl. E04h 17/18
U.S. Cl. 256—25                         6 Claims

ABSTRACT OF THE DISCLOSURE

A portable enclosure comprising a plurality of wire mesh panels interconnected by hinges and each supported by vertical end members, and a gate having a stationary section and a slidably movable section whereby the enclosure is easily assembled without anchoring it in the ground and the gate permits easy access to the enclosure.

BACKGROUND OF THE INVENTION

The present invention pertains to portable enclosures and more specifically to portable enclosures capable of restraining horses.

Conventional enclosures or paddocks for horses are stationary wooden structures of permanently defined area and are usually rectangularly shaped. Such paddocks have the disadvantages that they are not adjustable to the temperaments of individual horses to provide the most desirable enclosure and they cannot be transported to different locations without extensive and time consuming dismantling and rebuilding in the new location. A further disadvantage with respect to racehorses is that conventional paddocks are not conducive to proper warming up before a race or workout and cooling down after a race or workout because the rectangular shape of the paddock does not encourage continuous movement. That is, the animal has a tendency to remain still in a corner rather than moving around the paddock continuously.

Conventional portable enclosures are cumbersome in that they must be imbedded in the ground in order to provide a stable structure, and they do not have suitable gates or doors for the entry and security of animals.

SUMMARY OF THE INVENTION

Accordingly, an object of the present invention is to provide a portable enclosure that is easily assembled and yet sturdy.

Another object of the present invention is to utilize a gate having a sliding door in a portable enclosure.

A further object of the present invention is to construct a portable enclosure that need not be imbedded in the ground.

The present invention has another object in that a portable enclosure is constructed of a plurality of panels that are supported only by end members.

Another object of the present invention is to provide a portable enclosure having a plurality of hinged wire mesh panels and a sliding gate.

The present invention is generally characterized in that a plurality of wire mesh panels are interconnected by hinges along with a gate having a stationary section and a movable section to form a portable enclosure.

One advantage of a portable enclosure according to the present invention is that it may be easily assembled due to its light weight and hinged and pivotable movement and due to the fact that it need not be imbedded in the ground. A further advantage of the present invention is that the gate is not easily opened by an animal even when it is unlatched.

The portable enclosure of the present invention has many uses such as for restraining animals, storing goods and securing areas. With respect to racehorses the portable enclosure of the present invention is especially useful in that it can be transported along with the horse to a track, and after a race or a workout the horse may be placed in the enclosure to gradually cool down without the need of a groom to watch the horse. Another use for the enclosure is to store and protect goods on a farm, such as corn, when the enclosure must be frequently moved. Yet another use for the enclosure is to secure the area around a trailer which requires portability. Basically the present invention is extremely useful in any situation that requires a fence or enclosure to be frequently moved.

Other objects and advantages of the present invention will become apparent from the following description of the accompanying drawings.

BRIEF DESCRIPTION OF THE DRAWINGS

FIG. 1 is a top view of an enclosure constructed in accordance with the present invention;

FIG. 2 is a front elevation of the enclosure of FIG. 1;

FIG. 5 is a front elevation of the gate of the enclosure of FIG. 1;

FIG. 6 is a cross-sectional view of the gate of FIG. 5 taken along lines 6—6; and FIG. 7 is a cross-sectional view of the gate of FIG. 5 taken along lines 7—7.

DESCRIPTION OF THE PREFERRED EMBODIMENTS

Figure 3:
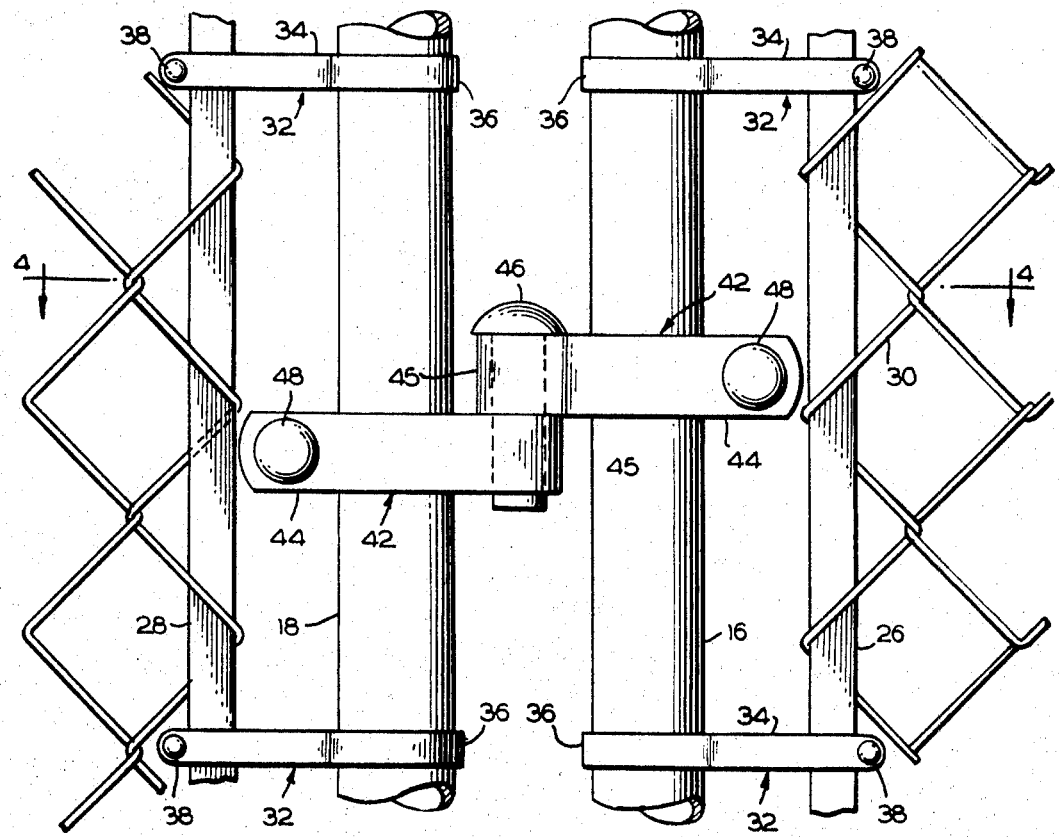
FIG. 3 is a partial elevation of the connection of the panels of the enclosure of FIG. 1.

An enclosure constructed in accordance with the present invention is illustrated in FIG. 1 and comprises a plurality of panels 10 being interconnected to form an enclosure having a gate 12 which is connected at either end to panels 10a and 10b. The panels 10 are interconnected by hinges 14, and gate 12 is connected to panels 10a and 10b by hinges 14a and 14b, respectively, to provide a flexible enclosure capable of assuming any desired shape. The twelve panel, generally circular, configuration of FIG. 1 is utilized for illustrative purposes only, and it is clear that the enclosure of the present invention may assume any desired configuration utilizing any number of panels.

A front elevation of the enclosure of FIG. 1 is illustrated in FIG. 2 and it can be seen that gate 12 extends above the panel 10; however, the height of gate 12 and the panels 10 is dependent on the size and agility of the animals to be kept in the enclosure, the amount of goods to be stored or the security desired. Each panel 10 has two vertical tubular support members 16 and 18, each of which is secured to three horizontal tubular support members 20, 22 and 24. The lowermost horizontal support member 20 is secured to vertical support members 16 and 18 an equally short distance from the bottom end thereof so that member 20 is suspended above the ground, and the uppermost horizontal support member 22 is secured to vertical support members 16 and 18 near the top ends thereof. The center horizontal support member 24 is spaced intermediate members 20 and 22 and secured to members 16 and 18 at their approximate center to provide a sturdy but lightweight frame for each panel.

Figure 4:
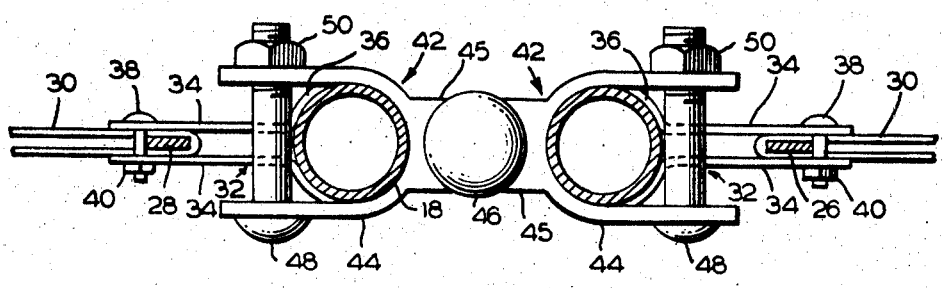
FIG. 4 is a cross-sectional view of FIG. 3 taken along lines 4—4.

As shown best in FIGS. 3 and 4, which are an enlarged view of the interconnection of panels 10 and a cross-section thereof, respectively, each panel 10 includes two flat mesh supporting members 26 and 28 which are disposed parallel to and attached to vertical support members 16 and 18, respectively. A conventional twisted wire mesh 30 has its horizontal extremities wrapped around members 26 and 28 and its vertical extremities are attached to members 20 and 24 in any conventional manner, such as by tying the mesh thereto with wire.

Members 26 and 28 are attached to members 16 and 18, respectively, by a plurality of vertically spaced brackets 32 which comprise parallel extending arms 34 and an annular portion 36 arranged to grip members 26 and 28. The ends of arms 34 are secured together to clamp members 26 and 28 by bolts 38 which extend through aligned holes in arms 34 to threadedly engage nuts 40.

Each panel 10 has two vertically spaced hinge arms 42 on each vertical support member 16 and 18. Each hinge arm 42 has a U-shaped portion 44 adapted to grip members 16 and 18 and an arcuate head portion 45 having a bore therein for insertion of a hinge pin 46. Bolts 48 are inserted through the extremities of the U-shaped portions 44 to threadedly engage nuts 50 to securely clamp the hinge arms 42 to the vertical support members 16 and 18 in such a position that when two of the panels 10 are placed adjacent one another the hinge arms 42 will have their bores aligned for insertion of hinge pins 46.

Gate 12 can best be described with reference to FIGS. 5, 6 and 7. Gate 12 comprises a rigid frame having vertical tubular support members 52 and 54 and two parallel horizontal tubular support members 56 and 58 are attached to the bottom of members 52 and 54 to define a slot 59 running along the length of the gate. Members 52 and 54 are attached near their tops to a horizontal tubular support member 60, and the frame is completed by a third vertical tubular support member 62 which is attached to members 56 and 60. Members 52, 54, 56, 60 and 62 are disposed in a single vertical plane, and member 58 is connected with member 56 and members 52 and 54 at each side of the gate by a tubular connecting piece. A pair of flat mesh supporting members 66 and 68 are supported in a parallel relationship with members 52 and 62, respectively, by brackets 70 in the same manner as described with respect to the panels 10.

A stationary panel is formed in gate 12 by winding the edges of a twisted wire mesh 72 around members 66 and 68 and attaching the top of mesh 72 to member 60, the center of mesh 72 to a tubular cross member 74 and the bottom of mesh 72 to member 56.

A housing 76 is attached, such as by welding, at the top of gate 12 to members 52, 54, 60 and 62 and is shaped to have a longitudinal slot 78 and longitudinal tracks 80 and 82.

Gate 12 has a movable door formed therein comprising a frame having vertical tubular members 86 and 88 and horizontal tubular members 90 and 92 attached at their ends to form a rectangular frame that is suspended by support rods 94 extending vertically from the axles 96 of nylon rollers 98 which are adapted to ride in tracks 80 and 82. Rods 94 are attached to upper horizontal members 90 and are of such length that the frame of the second panel is suspended in the frame of gate 12 and is slidable from one side thereof to the other. A plurality of guide pins 100 are threadedly secured in the lower horizontal member 92 and extend vertically therefrom so that they are adapted to ride in the slot defined by members 56 and 58 to act as a guide for sliding movement of the movable door and also to prevent pivotal movement of the second panel about rollers 98. Guide pins 100 may be removed by unscrewing them via their heads 101 in order to remove the sliding door. A twisted wire mesh 102 is disposed on the movable door by attaching its upper and lower ends to members 90 and 92, respectively, and winding its sides around mesh supporting members 104 and 106 which are disposed parallel to and attached to members 86 and 88 by brackets 108 in the same manner as described with respect to the panels 10.

When the door is moved to its closed position, as illustrated in FIG. 5, it may be secured by a latch 110 that grips a horizontally extending right-angled bar 112, and in order to permit entrance to and exit from the enclosure the sliding door may be moved to the left after opening the latch. Stops may be provided across slots 78 at the ends of housing 76 in order to limit movement of the slidable door upon opening and closing by engaging the rod 94 on the leading rollers 98, and stops may also be provided in slot 59 for the same purpose to complement the stops in housing 76 or without utilizing the stops in housing 76. The stops in slot 59 may be formed of pieces of pipe, such as 64, of the same diameter as members 56 and 58 and positioned transversely thereacross. In order to provide a stable gate it is desirable to utilize three stops in slot 59, one located just to the right of each guide pin 100 when the slidable door is closed, and one located just to the left of the left guide pin 100 when the slidable door is in its fully opened position. The location of the three stops as above described is possible because, in practice, the slidable door of the gate 12 will be wider than the width between members 54 and 62 and thus will overlap the stationary panel. The slidable door is illustrated in FIGS. 2 and 5 as being smaller in order to more clearly point out the structure thereof; however, normally when the slidable door is closed members 54 and 88, and 62 and 86 will be aligned. The space between members 54 and 16 is sufficiently wide so that a person inside the enclosure can open the latch.

Assembly of the enclosure of the present invention is easily accomplished by merely determining the size and shape of enclosure desired and the number of panels required, and then interconnecting the panels by their hinges. The only parts of the panels that are in contact with the ground are the vertical support members; and, thus, the panels may be easily adjusted by lifting one side and pivoting the panel on the vertical support member on the other side. Once two or three panels are connected together, depending on the angle therebetween, the panels will support themselves and a single person can fully assemble the enclosure. The panels are easily transported by stacking them singly in compact form.

The sliding gate has the advantage that an animal may be led adjacent thereto before the gate is opened thereby reducing the possibility of escape. A further advantage is that even if the sliding panel is not latched, it cannot be opened by a force such as an animal pushing against it since the force to open the gate must be applied along the sliding path. Another advantage of the sliding gate of the present invention is that it may be in contact with the ground to increase the stability of the gate and the enclosure without decreasing the ease of assembling the enclosure. Other types of gates, such as swinging gates, may be utilized with the present invention without the above advantages attendant the sliding gate.

A modification of the present invention is shown in dotted lines in FIG. 1 and includes a ring of the panels 10 inside the enclosure to define a circular path around the enclosure. Thus, a horse that has recently finished a race or workout may be placed in the enclosure and will continuously move along the circular path to permit gradual cooling.

The structural components of the panels and gate of the enclosure of the present invention, such as the tubular members, support rods, guide pins, and the housing, may be assembled in any conventional suitable manner such as welding and/or nuts and bolts, and the hinges may be adjusted by merely loosening bolts 48. Any conventional corrosion proof fencing material such as galvanized metal, vinyl coated wire, or aluminum may be used to construct an enclosure according to the present invention; and, while it is advantageous to provide panels and structural components of uniform size and shape, any desirable variations may be afforded. For instance, panels larger and smaller than the panels 10 may be utilized therewith when the desired configuration of the enclosure requires it.

Thus, it can be seen that the enclosure of the present invention is easily transported due to its light wheels, easily assembled due to its uniformity and the pivotal adjustment provided by supporting each panel on only its vertical end members, easily shaped to the desired configuration due to the hinging interconnection between panels, and securely gated due to the sliding door in the gate.

Inasmuch as the present invention is subject to many modifications, variations and changes in detail, it is intended that all matter contained in the foregoing description or shown in the accompanying drawings shall be interpreted as illustrative and not in a limiting sense.

What is claimed is:

1. A portable enclosure comprising a plurality of panels, each of said panels including a frame having end members and a wire mesh disposed on said frame; hinge means mounted on said end members of each of said panels for interconnecting said panels at adjacent end members; and gate means including a rigid rectangular frame having an upper member, a lower member, a first side member and a second side member, a stationary wire mesh panel secured to said upper member and said lower member adjacent said first side member of said rigid frame, said upper member including a housing, a slot in said lower member, and a movable wire mesh panel having rollers disposed in said housing to slidably support said movable wire mesh panel, said wire mesh panel having pins extending into said slot in said lower member, said movable wire mesh panel being adjacent said second side member when said gate means is closed and said movable wire mesh panel being adjacent said first side member and said stationary wire mesh panel when said gate means is open; said hinge means including means for interconnecting said gate means with two of said panels.

2. The invention as recited in claim 1 wherein each of said panel frames further includes a bottom member attached to said end members near the ends thereof so that said panels are supported on a surface only by said end members, and means for attaching the bottom of said wire mesh to said bottom member so that a space is provided between the bottom of said wire mesh and the surface on which the panel is supported.

3. The invention as recited in claim 1 wherein said gate means includes a latch for securing said movable panel to said second side member when said gate means is closed.

4. The invention as recited in claim 1 wherein said hinge means include bolts for movably mounting said hinge means on said end members.

5. The invention as recited in claim 1 wherein each of said panel frames includes mesh supporting members disposed parallel to said end members, a top member disposed transverse to and connected with said end members, a bottom member disposed transverse to and connected with said end members, bracket means for attaching said mesh supporting members to said end members, and means for connecting said wire mesh to said top member and said bottom member.

6. The invention as recited in claim 5 wherein said bottom member is connected with said end members at a predetermined distance from the bottom ends thereof whereby said panels are supported only by said end members.

References Cited
UNITED STATES PATENTS

| 2,835,223 | 5/1958 | Erickson | 256—26 X |
| 3,021,114 | 2/1962 | O'Connell | 256—47 X |
| 3,204,606 | 9/1965 | Parr et al. | 256—26 X |
| 3,370,835 | 2/1968 | Crowson | 256—26 |

DENNIS L. TAYLOR, Primary Examiner

U.S. Cl. X.R.

256—26